US012700699B2

(12) United States Patent
Xue et al.

(10) Patent No.: US 12,700,699 B2
(45) Date of Patent: Aug. 4, 2026

(54) ELECTRICAL CONNECTOR ASSEMBLY

(71) Applicants: Tyco Electronics Holdings (Bermuda) No. 7 Limited, Hamilton (BM); Tyco Electronics (Shanghai) Co., Ltd., Shanghai (CN)

(72) Inventors: Zhaohai (Tim) Xue, Shanghai (CN); Huei-Shun (Calvin) Feng, Taipei (TW); Xinjie (David) Zhang, Shanghai (CN); Yin (Erin) Xu, Shanghai (CN); Kehao (Asroc) Chen, Taipei (TW)

(73) Assignees: Tyco Electronics Holdings (Bermuda) No. 7 Limited, Hamilton (BM); Tyco Electronics (Shanghai) Co., Ltd., Shanghai (CN)

( * ) Notice: Subject to any disclaimer, the term of this patent is extended or adjusted under 35 U.S.C. 154(b) by 395 days.

(21) Appl. No.: 18/408,652

(22) Filed: Jan. 10, 2024

(65) Prior Publication Data

US 2024/0235121 A1 Jul. 11, 2024

(30) Foreign Application Priority Data

Jan. 10, 2023 (CN) ......................... 202310037383.9

(51) Int. Cl.
*H01R 13/646* (2011.01)
*H01R 12/73* (2011.01)

(52) U.S. Cl.
CPC ......... *H01R 13/646* (2013.01); *H01R 12/737* (2013.01)

(58) Field of Classification Search
CPC ............................ H01R 13/646; H01R 12/737
USPC .................................................... 439/65, 108
See application file for complete search history.

(56) References Cited

U.S. PATENT DOCUMENTS 4,824,384 A * 4/1989 Nicholas .............. H01R 12/775 439/496
5,104,329 A * 4/1992 Brown ................. H01R 12/724 439/108
5,967,806 A * 10/1999 Patterson ............ H01R 12/716 439/108
6,089,883 A * 7/2000 McHugh ................ H01R 12/00 439/108
8,137,119 B2 * 3/2012 Stoner ................ H01R 13/7033 439/108
8,167,631 B2 * 5/2012 Ito ........................ H01R 12/721 439/108

(Continued)

*Primary Examiner* — Gary F Paumen
(74) *Attorney, Agent, or Firm* — Barley Snyder

(57) ABSTRACT

An electrical connector assembly includes a socket connector and a plug connector pluggably connected to the socket connector. The socket connector includes a first housing, a plurality of first signal contacts within the first housing, a plurality of first ground contacts within the first housing, and a first common ground member within the first housing. The first common ground member implements a common grounding of the first ground contacts. The plug connector includes a second housing, a plurality of second signal contacts in the second housing, a plurality of second ground contacts in the second housing, and a second common ground member in the second housing. The second common ground member implements a common grounding of the second ground contacts. The first common ground member and the second common ground member are in a detachable contact connection.

20 Claims, 5 Drawing Sheets

(56) References Cited

U.S. PATENT DOCUMENTS

| | | | | |
|---|---|---|---|---|
| 8,905,786 | B2 * | 12/2014 | Davis | H01R 13/6587<br>439/607.1 |
| 10,490,920 | B2 * | 11/2019 | Manickam | H01R 13/648 |
| 10,581,206 | B2 * | 3/2020 | Fang | H01R 13/646 |
| 2011/0189895 | A1 * | 8/2011 | Ito | H01R 24/38<br>439/629 |
| 2016/0006182 | A1 * | 1/2016 | Patel | H01R 13/6597<br>439/108 |
| 2019/0190212 | A1 * | 6/2019 | Fang | H01R 13/646 |
| 2020/0373696 | A1 * | 11/2020 | Buck | H01R 12/716 |

* cited by examiner

ELECTRICAL CONNECTOR ASSEMBLY

CROSS-REFERENCE TO RELATED APPLICATION

This application claims the benefit of the filing date under 35 U.S.C. § 119(a)-(d) of Chinese patent application Ser. No. 20/2310037383.9, filed on Jan. 10, 2023.

FIELD OF THE INVENTION

Embodiments of the present disclosure generally relate to a technical field of electrical connectors, and in particular, to an electrical connector assembly.

BACKGROUND

In existing card edge connector assemblies, a socket connector uses a common ground sheet to connect all ground contacts of the connector together to improve SI (Signal Integration) performance. However, the existing design of the common ground sheet cannot improve the grounding connection between the ground contacts of the socket connector and a ground layer in a printed circuit board, and cannot support the corresponding SI requirements for the next-generation 128 G high-speed transmission.

In the existing card edge connector assemblies, a plug connector (such as Add-in Card (AIC)) is inserted into the socket connector. However, there is no common ground sheet provided at the ground contacts of the plug connector, which adversely affects the overall SI performance of the entire card edge connector assembly.

SUMMARY

An electrical connector assembly includes a socket connector and a plug connector pluggably connected to the socket connector. The socket connector includes a first housing, a plurality of first signal contacts within the first housing, a plurality of first ground contacts within the first housing, and a first common ground member within the first housing. The first common ground member implements a common grounding of the first ground contacts. The plug connector includes a second housing, a plurality of second signal contacts in the second housing, a plurality of second ground contacts in the second housing, and a second common ground member in the second housing. The second common ground member implements a common grounding of the second ground contacts. The first common ground member and the second common ground member are in a detachable contact connection.

BRIEF DESCRIPTION OF THE DRAWINGS

Features of the present invention will become more apparent by describing in detail exemplary embodiments thereof with reference to the accompanying drawings, in which.

DETAILED DESCRIPTION OF EMBODIMENTS

Figure 1:
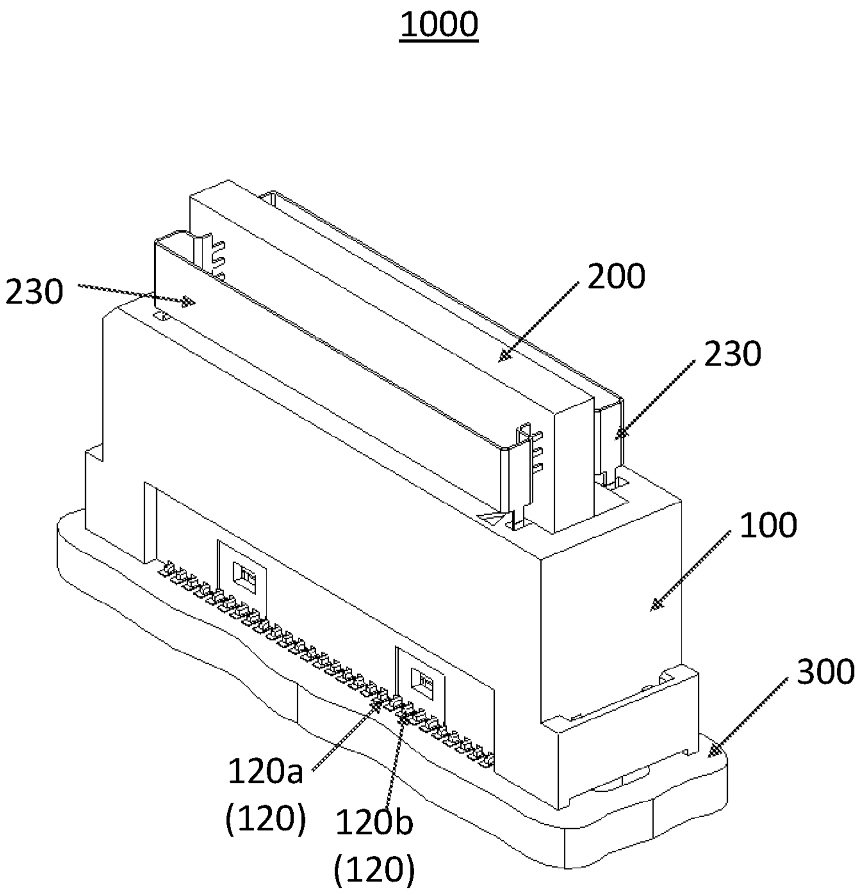
FIG. 1 shows a perspective view of an electrical connector assembly according to an exemplary embodiment of the present disclosure after assembling.

Embodiments of the present disclosure will be described hereinafter in detail taken in conjunction with the accompanying drawings. In the description, the same or similar parts are indicated by the same or similar reference numerals. The description of each of the embodiments of the present disclosure hereinafter with reference to the accompanying drawings is intended to explain the general inventive concept of the present disclosure and should not be construed as a limitation on the present disclosure.

In addition, in the following detailed description, for the sake of explanation, numerous specific details are set forth in order to provide a thorough understanding of the disclosed embodiments. It will be apparent, however, that one or more embodiments may also be practiced without these specific details. In other instances, well-known structures and devices are illustrated schematically in order to simplify the drawing.

Figure 2:
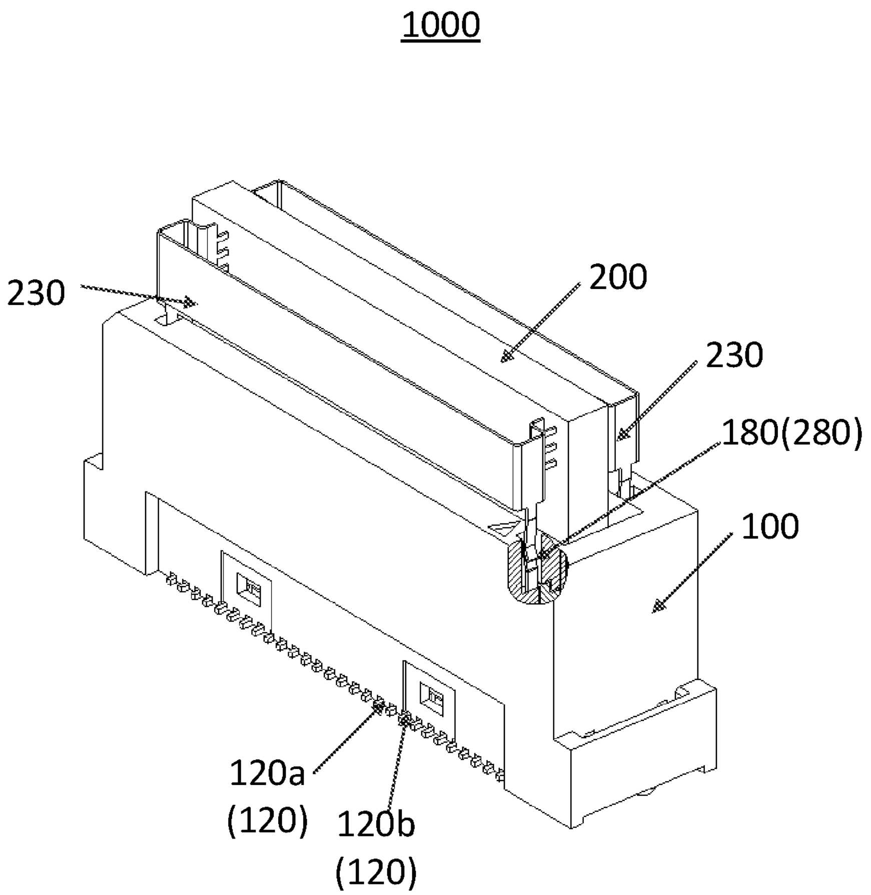
FIG. 2 shows a partially sectional perspective view of a socket connector and a plug connector assembled together in the electrical connector assembly according to an exemplary embodiment of the present disclosure.
Figure 3:
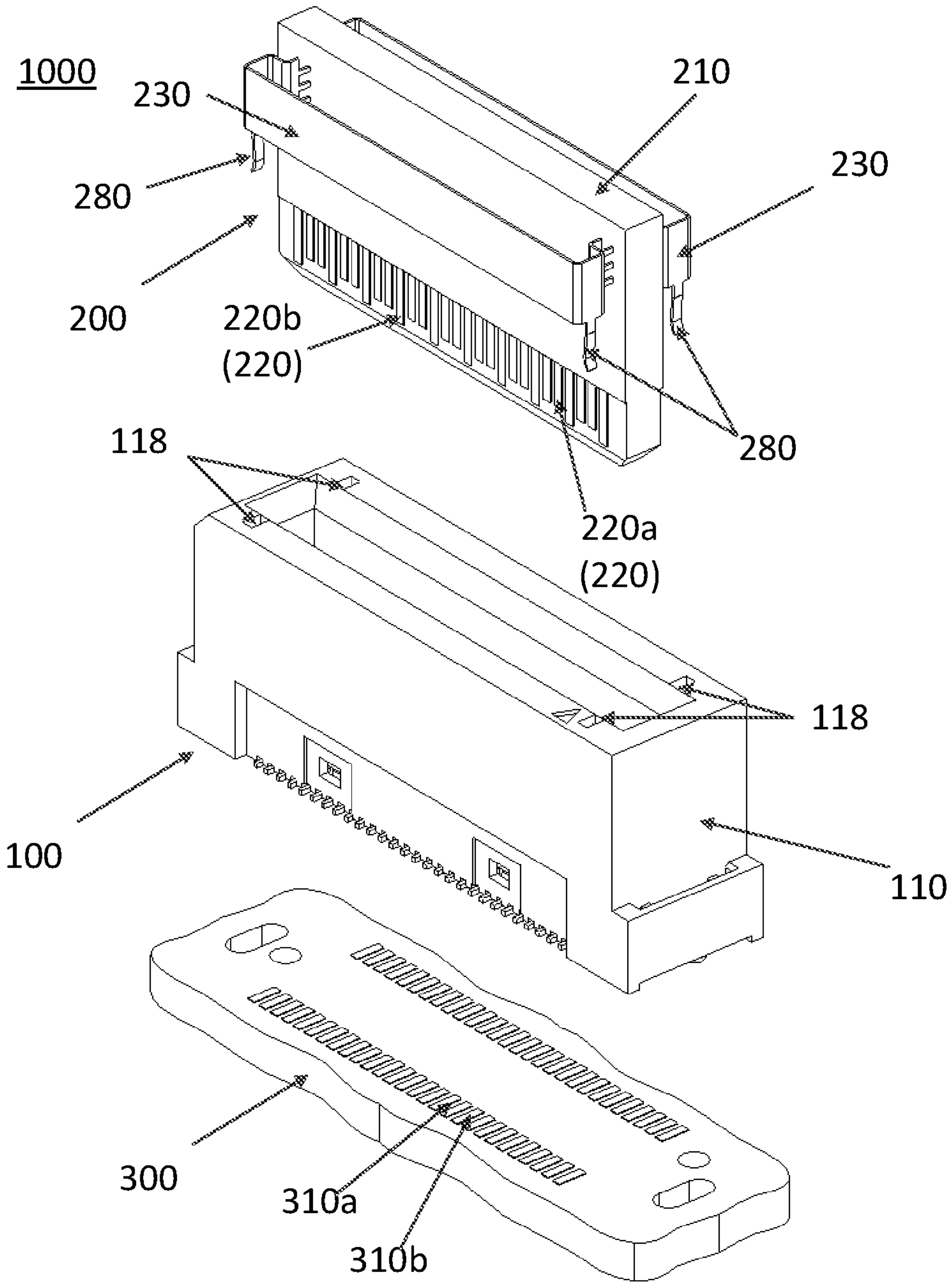
FIG. 3 shows a perspective view of the electrical connector assembly according to an exemplary embodiment of the present disclosure before assembling.
Figure 4:
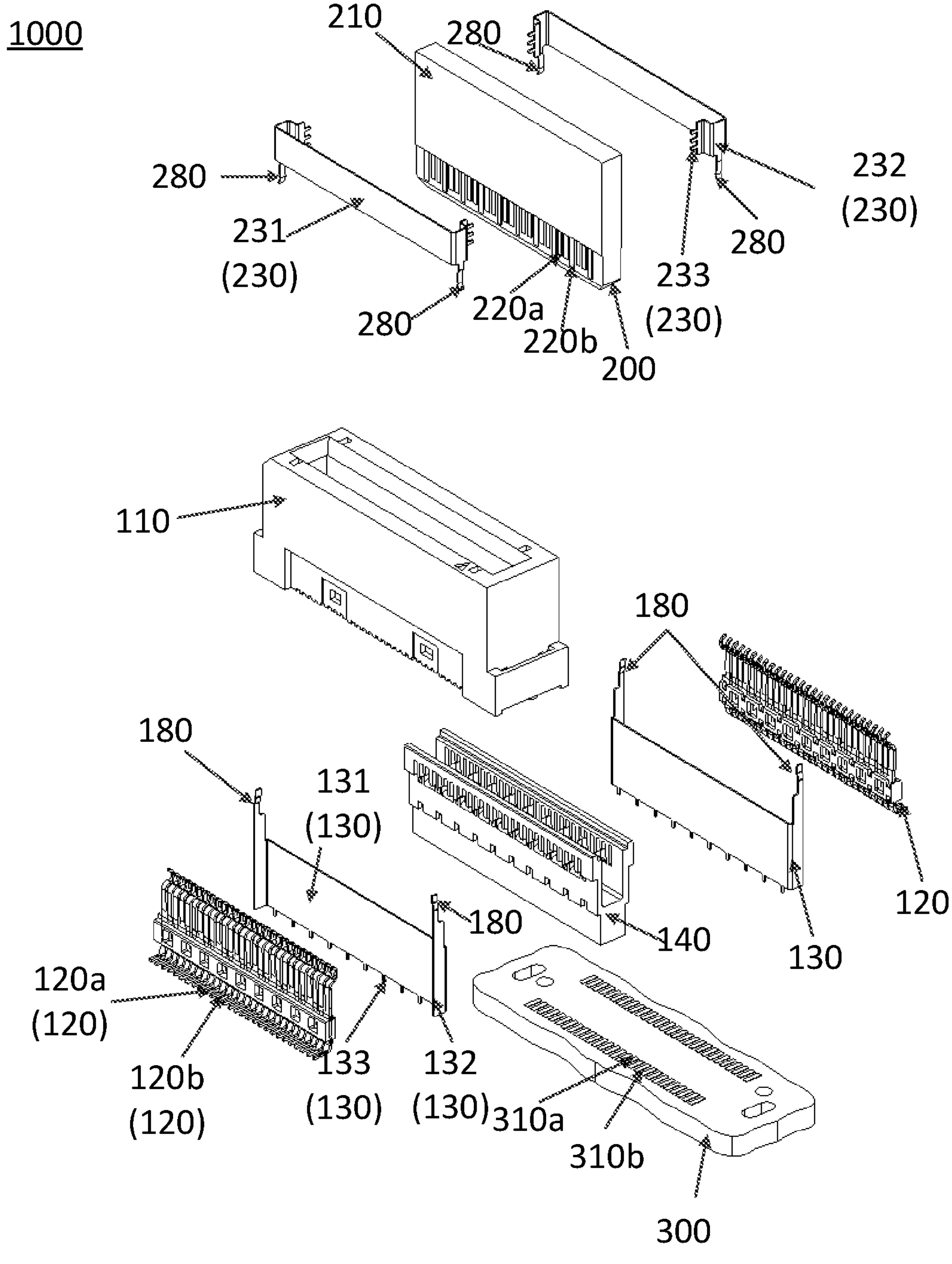
FIG. 4 shows an exploded perspective view of the electrical connector assembly according to an exemplary embodiment of the present disclosure.
Figure 5:
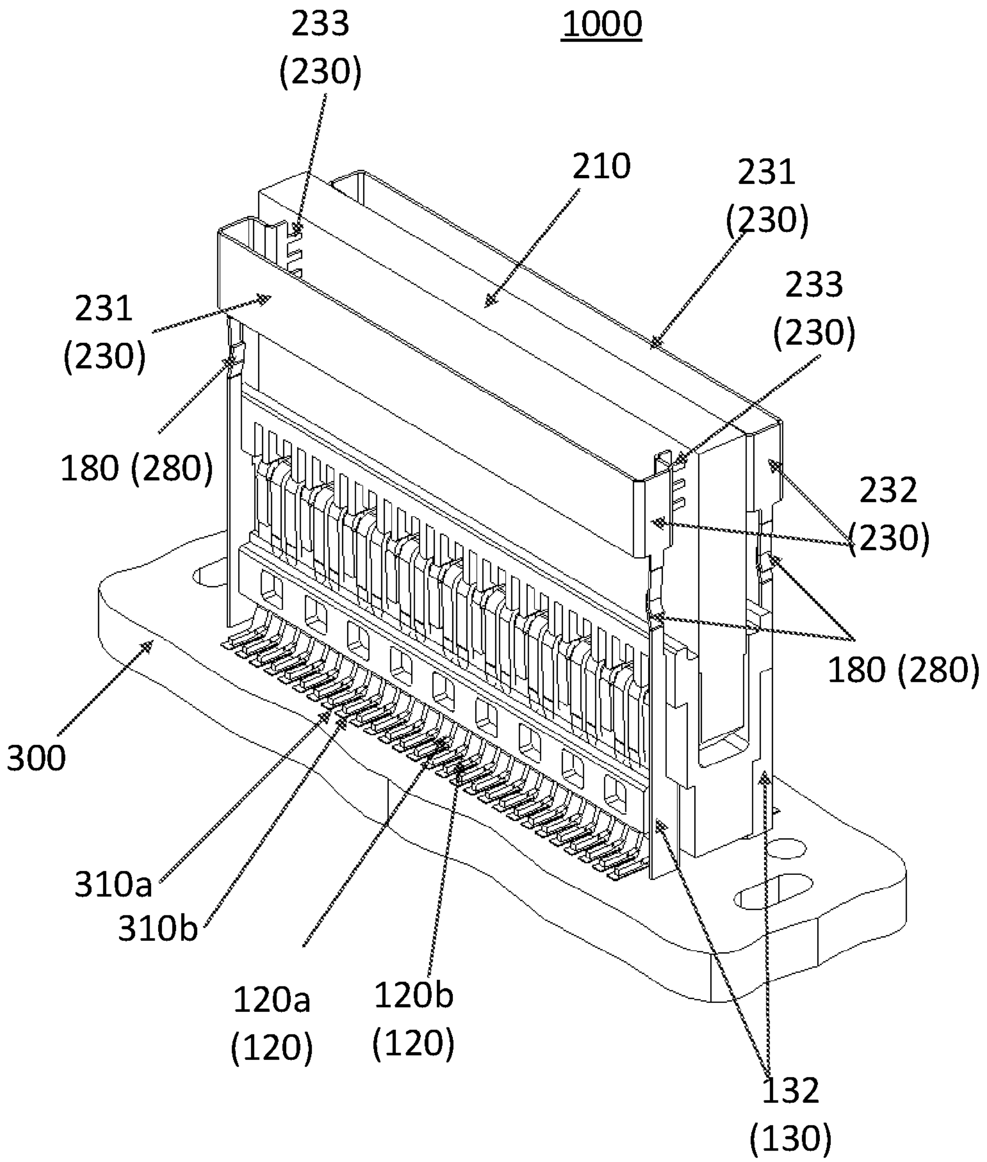
FIG. 5 shows a schematic structural view of the electrical connector assembly according to an exemplary embodiment of the present disclosure after assembling, with a first housing omitted to display an internal structure.

FIG. 1 shows a schematic structural view of an electrical connector assembly 1000 according to an exemplary embodiment of the present disclosure after assembling, in which a socket connector 100, a plug connector 200, and a printed circuit board 300 are assembled together. FIG. 2 shows a schematic structural view of the socket connector 100 and the plug connector 200 assembled together in the electrical connector assembly according to the exemplary embodiment of the present disclosure, in which a portion of the socket connector 100 is cut to display a detachable locking structure formed in a slot within a first housing 110 between an elastic locking member 180 of the first common ground member 130 and a locking groove 280 of the second common ground member 230, which will be described in detail below. FIG. 3 shows a schematic structural view of the electrical connector assembly 1000 according to an exemplary embodiment of the present disclosure before assembling, in which the socket connector 100, the plug connector 200, and the printed circuit board 300 are independent of each other and have not yet been assembled together. FIG. 4 shows a schematic explosion view of the electrical connector assembly 1000 according to an exemplary embodiment of the present disclosure, showing various components and their constructions within the electrical connector assembly 1000. FIG. 5 shows a schematic structural view of the electrical connector assembly according to an exemplary embodiment of the present disclosure after assembling, with the first housing omitted to display the coordination relationship between various components within the electrical connector assembly 1000 (including ground contacts and common ground members, etc.).

Referring to FIGS. 1 to 5, according to an embodiment of the present disclosure, there is provided an electrical connector assembly 1000. The electrical connector assembly 1000 includes a socket connector 100 and a plug connector 200 pluggably connected to the socket connector 100.

The socket connector 100, as shown in FIGS. 3 and 4, includes a first housing 110, a plurality of first signal contacts 120*a* and a plurality of first ground contacts 120*b* provided within the first housing 110, and a first common ground member 130. The first common ground member 130 is provided within the first housing 110 and implements a common grounding of the plurality of first ground contacts 120*b*.

The plug connector 200, as shown in FIGS. 3 and 4, includes a second housing 210, a plurality of second signal contacts 220*a* and a plurality of second ground contacts 220*b* provided in the second housing 210, and a second common ground member 230. The second common ground member 230 is provided in the second housing 210 and is configured to implement a common grounding of the plurality of second ground contacts 220*b*.

According to the embodiment of the present disclosure, in the electrical connector assembly 1000, the first common ground member 130 and the second common ground member 230 are in a detachable contact connection. For example, when the plug connector 200 is inserted into the socket connector 100, the first common ground member 130 in the socket connector 100 and the second common ground member 230 in the plug connector 200 are in a detachable contact connection.

In the embodiment shown in FIG. 4, the first common ground member 130 includes a first plate-shaped portion 131 and a first arm portion 132. The first arm portion 132 is formed by bending from opposite sides of the first plate-shaped portion 131 and extends towards the plug connector 200 in a plugging direction (such as the up and down direction in FIGS. 3 and 4) of the socket connector 100 and the plug connector 200. In the exemplary embodiment illustrated, opposite sides of the first plate-shaped portion 131 are formed with one first arm portion 132, respectively.

The second common ground member 230, as shown in FIGS. 4 and 5, includes a second plate-shaped portion 231, a second arm portion 232, and a connecting portion 233. The second arm portion 232 is formed by bending from opposite sides of the second plate-shaped portion 231, and extends towards the socket connector 100 in the plugging direction of the socket connector 100 and the plug connector 200. In the exemplary embodiment illustrated, opposite sides of the second plate-shaped portion 231 are formed with one second arm portion 232, respectively. The connecting portion 233 is formed by bending each second arm portion 232 towards the second housing 210, and is connected to the plurality of second ground contacts 220*b*.

In the shown embodiment, both the first plate-shaped portion 131 of the first common ground member 130 and the plurality of first ground contacts 120*b* are connected to a ground layer in the printed circuit board 300, which will be described in detail below, in order to implement the grounding connection between the plurality of first ground contacts 120*b* and the first common ground member 130. Both the connecting portion 233 of the second common ground member 230 and the plurality of second ground contacts 220*b* are connected to a grounding layer in an internal circuit board of the plug connector 200 to implement the grounding connection between the plurality of second ground contacts 220*b* and the second common ground member 230. According to the embodiment of the present disclosure, each first arm portion 132 of the first common ground member 130 and the corresponding second arm portion 232 of the second common ground member 230 are in a detachable contact connection. For example, when the plug connector 200 is inserted into the socket connector 100, each first arm portion 132 of the first common ground member 130 in the socket connector 100 and a corresponding second arm portion 232 of the second common ground member 230 in the plug connector 200 are in a detachable contact connection inside a slot within the first housing 110, as shown in FIG. 2.

According to the electrical connector assembly 1000 provided by the embodiment of the present disclosure, the second common ground member 230 is added to the plug connector 200, and the ground path between the second common ground member 230 provided in the plug connector 200 and the first common ground member 130 provided within the socket connector 100 is achieved by enabling them in a detachable contact connection, so that the strong coupling between the first common ground member 130 in the socket connector 100 and the first signal contact 120*a* is generated, improving the overall SI performance of the electrical connector assembly 1000.

According to the embodiment of the present disclosure, as shown in FIGS. 1 to 5, an elastic locking member 180 is formed on one of the first arm portion 132 and the second arm portion 232, a locking groove 280 is formed in the other of the first arm portion 132 and the second arm portion 232, and a detachable locking structure is formed between the elastic locking member 180 and the locking groove 280. In the shown embodiment, for example in FIG. 4, two first arm portions 132 located on opposite sides of the first common ground member 130 are formed with one elastic locking member 180, respectively, and two second arm portions 232 located on opposite sides of the second common ground member 230 are formed with one locking groove 280, respectively. A stable connection has been established between the second common ground member 230 and the first common ground member 130 by the locking structure.

According to the embodiment of the present disclosure, as shown in FIGS. 1, 2, and 4, the plurality of first signal contacts 120*a* and the plurality of first ground contacts 120*b* are alternately arranged to form a row of first contacts 120. According to the exemplary embodiment illustrated, in the row of first contacts 120, every two first signal contacts 120*a* and every one first ground contact 120*b* are alternately arranged, but other embodiments are not limited to this arrangement. The first plate-shaped portion 131 of the first common ground member 130 is arranged on a side of the row of first contacts 120, and the first arm portion 132 of the first common ground member 130 is arranged on the opposite side of the row of first contacts 120. That is to say, as shown in FIGS. 4 and 5, the first common ground member 130 extends to the left and right sides of the row of first contacts 120, respectively.

The plurality of second signal contacts 220*a* and the plurality of second ground contacts 220*b* are alternately arranged to form a row of second contacts 220, as shown in FIGS. 3 and 4. According to the exemplary embodiment illustrated, in the row of second contacts 220, every two second signal contacts 220*a* and every one second ground contact 220*b* are alternately arranged, but other embodiments are not limited to this arrangement. The second plate-shaped portion 231 of the second common ground member 230 is arranged on a side of the row of second contacts 220, and the second arm portion 232 of the second common ground member 230 is arranged on the opposite side of the row of second contacts 220. That is to say, as shown in FIGS. 3 and 4, the second common ground member 230 extends to the left and right sides of the row of second contacts 220. In this way, the overall SI performance of the electrical connector assembly 1000 is further improved.

According to the embodiment of the present disclosure, as shown in FIG. 4, the socket connector 100 further includes an intermediate 140 provided within the first housing 110. In an embodiment, the intermediate 140 has a roughly Y-shaped cross-section. Moreover, the socket connector 100 includes two rows of first contacts 120 composed of the first signal contacts 120*a* and the first ground contacts 120*b*. As shown in FIG. 4, the two rows of first contacts 120 are arranged on opposite surfaces of the intermediate 140, and one first common ground member 130 is arranged between each row of first contacts 120 and the corresponding surface of the intermediate 140.

In the shown embodiment, the plug connector 200 includes two rows of second contacts 220 composed of the second signal contacts 220*a* and the second ground contacts 220*b*. As shown in FIGS. 4 and 5, these two rows of second contacts 220 are arranged on opposite surfaces of the second housing 210, respectively, and one second common ground member 230 is arranged outside each surface of the opposite surfaces of the second housing 210.

In an embodiment, the first plate-shaped portion 131 and the first arm portion 132 of the first common ground member 130 are integrally formed; and the second plate-shaped portion 231, the second arm portion 232, and the connecting portion 233 of the second common ground member 230 are integrally formed. In an embodiment, both the first common ground member 130 and the second common ground member 230 are made of conductive metal, the first housing 110, the second housing 210, and the intermediate 140 are made of materials with electrical insulation properties, and the signal contacts 120*a*, 220*a*, and the ground contacts 120*b*, 220*b* are made of materials with electrical conductivity properties.

According to the embodiment of the present disclosure, as shown in FIGS. 1 and 3-5, the electrical connector assembly 1000 further includes the printed circuit board 300. A plurality of signal contacting points 310*a* for being electrically connected to the plurality of first signal contacts 120*a*, respectively, and a plurality of ground contacting points 310*b* for being electrically connected to the plurality of first ground contacts 120*b*, respectively, are formed on a surface of the printed circuit board 300. In the electrical connector assembly 1000, the first common ground member 130 provided in the socket connector 100 and the plurality of first ground contacts 120*b* connected to the plurality of contacting points 310*b* on the printed circuit board 300 are connected to the grounding layer in the printed circuit board 300, thereby optimizing the grounding path of the ground contacts in both the plug connector 200 and the socket connector 100, and further improving the overall SI performance of the electrical connector assembly 1000.

In the embodiment shown in FIG. 5, the first plate-shaped portion 131 of the first common ground member 130 is configured such that an edge of the first plate-shaped portion 131 is close to or adjacent to the surface of the printed circuit board 300 when the socket connector 100 is assembled onto the printed circuit board 300. According to the electrical connector assembly 1000, the first common ground member 130 in the socket connector 100 is as close to or as adjacent to the printed circuit board 300 as possible, thereby achieving the strong coupling between the signal contact in the socket connector 100 and the first common ground member 130, and further improving the overall SI performance of the electrical connector assembly 1000.

According to an embodiment of the present disclosure, for example, as shown in FIG. 4, the first common ground member 130 includes plurality of mating portions 133 extending from the edge of the first plate-shaped portion 131. The plurality of mating portions 133 are connected to the ground layer in the printed circuit board 300 when the socket connector 100 is assembled onto the printed circuit board 300. Moreover, the plurality of first ground contacts 120*b* are connected to the grounding layer in the printed circuit board 300 via the plurality of ground contacting points 310*b*, respectively, when the socket connector 100 is assembled onto the printed circuit board 300. For example, the plurality of mating portions 133 are connected to the grounding layer in the printed circuit board 300 by through-holes, and the plurality of first ground contacts 120*b* are connected to the plurality of ground contacting points 310*b* by welding or press-fitting, and are connected to the grounding layer in the printed circuit board 300 via the plurality of ground contacting points 310*b*, respectively, thereby achieving the grounding connection between the first common ground member 130 and the plurality of first ground contacts 120*b*.

According to the electrical connector assembly 1000 provided by the foregoing exemplary embodiments of the present disclosure, the second common ground member 230 provided in the plug connector 200 and the first common ground member 130 provided in the socket connector 100 are in a detachable contact connection, and, further, both the first common ground member 130 and the plurality of first ground contacts 120*b* provided in the socket connector 100 are connected to the grounding layer in the printed circuit board 300, thereby optimizing the grounding path of all grounding contacts in both the plug connector 200 and socket connector 100 and the grounding layer in the printed circuit board 300, and improving the overall SI performance of the electrical connector assembly 1000. According to the electrical connector assembly 1000 provided by the foregoing exemplary embodiments of the present disclosure, the electrical connector assembly 1000 may be applied to, for example, card edge connector assemblies.

It should be appreciated by those skilled in this art that the above embodiments are intended to be illustrative, and many modifications may be made to the above embodiments by those skilled in this art. Further, various structures described in various embodiments may be freely combined with each other without conflicting in configuration or principle.

Although the present disclosure has been described hereinbefore in detail with reference to the accompanying drawings, it should be appreciated that the disclosed embodiments in the accompanying drawings are intended to illustrate embodiments of the present disclosure by way of example, and should not be construed as limitation to the present disclosure.

Although some embodiments of the general inventive concept of the present disclosure have been shown and described, it would be appreciated by those skilled in the art that changes or modification may be made to these embodiments without departing from the principles and spirit of the general inventive concept, the scope of which is defined in claims and their equivalents.

It should be noted that, the word "comprise" or "include" doesn't exclude other elements or steps, and the word "a" or "an" doesn't exclude more than a plurality. In addition, any reference numerals in the claims should not be interpreted as the limitation to the scope of the present disclosure.

What is claimed is:

1. An electrical connector assembly, comprising:

a socket connector including a first housing, a plurality of first signal contacts within the first housing, a plurality of first ground contacts within the first housing, and a first common ground member within the first housing, the first common ground member implementing a common grounding of the first ground contacts; and a plug connector pluggably connected to the socket connector, the plug connector includes a second housing, a plurality of second signal contacts in the second housing, a plurality of second ground contacts in the second housing, and a second common ground member in the second housing, the second common ground member implementing a common grounding of the second ground contacts, the first common ground member and the second common ground member are in a detachable contact connection.

2. The electrical connector assembly of claim 1, wherein the first common ground member includes a first plate-shaped portion and a first arm portion, the first arm portion is formed by bending from opposite sides of the first plate-shaped portion, the first arm portion extends toward the plug connector in a plugging direction of the socket connector and the plug connector.

3. The electrical connector assembly of claim 2, wherein the second common ground member includes a second plate-shaped portion, a second arm portion, and a connecting portion, the second arm portion is formed by bending from opposite sides of the second plate-shaped portion, the second arm portion extends toward the socket connector in the plugging direction.

4. The electrical connector assembly of claim 3, wherein the connecting portion is formed by bending from the second arm portion toward the second housing and is connected to the second ground contacts.

5. The electrical connector assembly of claim 3, wherein the first arm portion and the second arm portion are in the detachable contact connection.

6. The electrical connector assembly of claim 3, wherein an elastic locking member is formed on one of the first arm portion and the second arm portion and a locking groove is formed on the other of the first arm portion and the second arm portion, a detachable locking structure is formed between the elastic locking member and the locking groove.

7. The electrical connector assembly of claim 2, wherein the first plate-shaped portion and the first arm portion of the first common ground member are integrally formed.

8. The electrical connector assembly of claim 3, wherein the second plate-shaped portion, the second arm portion, and the connecting portion of the second common ground member are integrally formed.

9. The electrical connector assembly of claim 1, wherein the first common ground member and the second common ground member are both a conductive metal.

10. The electrical connector assembly of claim 2, wherein the first signal contacts and the first ground contacts are alternately arranged to form a row of first contacts.

11. The electrical connector assembly of claim 10, wherein the first plate-shaped portion is on a side of the row of first contacts and the first arm portion is on an opposite side of the row of first contacts.

12. The electrical connector assembly of claim 3, wherein the second signal contacts and the second ground contacts are alternately arranged to form a row of second contacts.

13. The electrical connector assembly of claim 12, wherein the second plate-shaped portion of the second common ground member is on a side of the row of second contacts and the second arm portion is on an opposite side of the row of second contacts.

14. The electrical connector assembly of claim 11, wherein the socket connector includes an intermediate within the first housing, the row of first contacts is one of a pair of rows of first contacts arranged on opposite surfaces of the intermediate, the first common ground member is between one of the rows of first contacts and the intermediate.

15. The electrical connector assembly of claim 13, wherein the row of second contacts is one of a pair of rows of second contacts arranged on opposite surfaces of the second housing, the second common ground member is arranged outside one of the opposite surfaces of the second housing.

16. The electrical connector assembly of claim 2, further comprising a printed circuit board, a plurality of signal contacting points on a surface of the printed circuit board are electrically connected to the first signal contacts, a plurality of ground contacting points of the printed circuit board are electrically connected to the first ground contacts.

17. The electrical connector assembly of claim 16, wherein the first plate-shaped portion has an edge close to or adjacent to the surface of the printed circuit board when the socket connector is assembled onto the printed circuit board.

18. The electrical connector assembly of claim 17, wherein the first common ground member has a plurality of mating portions extending from the edge of the first plate-shaped portion, the mating portions are connected to a grounding layer in the printed circuit board when the socket connector is assembled onto the printed circuit board.

19. The electrical connector assembly of claim 18, wherein the first ground contacts are connected to the grounding layer via the ground contacting points when the socket connector is assembled onto the printed circuit board.

20. The electrical connector assembly of claim 19, wherein the mating portions are connected to the grounding layer in the printed circuit board by a plurality of through-holes and the first ground contacts are connected to the ground contacting points by welding or press-fitting.

* * * * *